(12) United States Patent
Heller et al.

(10) Patent No.: US 7,029,053 B2
(45) Date of Patent: Apr. 18, 2006

(54) ROOF FOR A CONVERTIBLE VEHICLE INCLUDING LOCKING DEVICE

(75) Inventors: Alexander Heller, Munich (DE); Burkhard Reinsch, Kaufbeuren (DE)

(73) Assignee: Open Air Systems GmbH, Stockdorf (DE)

( * ) Notice: Subject to any disclaimer, the term of this patent is extended or adjusted under 35 U.S.C. 154(b) by 0 days.

(21) Appl. No.: 10/660,741

(22) Filed: Sep. 12, 2003

(65) Prior Publication Data
US 2005/0140165 A1    Jun. 30, 2005

(30) Foreign Application Priority Data
Sep. 13, 2002    (DE) ................................ 102 42 725

(51) Int. Cl.
*B60J 7/12*    (2006.01)

(52) U.S. Cl. .................................. 296/121; 296/107.17
(58) Field of Classification Search ................ 296/121, 296/107.17, 120.1, 108; 292/DIG. 5
See application file for complete search history.

(56) References Cited

U.S. PATENT DOCUMENTS

| 5,944,375 A | 8/1999 | Schenk et al. |
| 6,746,073 B1 * | 6/2004 | Heller et al. ................. 296/121 |
| 6,799,789 B1 * | 10/2004 | Guillez et al. .............. 296/121 |

FOREIGN PATENT DOCUMENTS

DE    196 34 511 C1    1/1998

* cited by examiner

*Primary Examiner*—Joseph D. Pape
(74) *Attorney, Agent, or Firm*—David S. Safran

(57) ABSTRACT

A roof for a convertible vehicle includes first and second roof parts which can be moved by a bearing mechanism between a closed position which covers an interior of the vehicle and a lowered position in a rear roof deposition space which exposes the vchicle interior. A locking device is provided for interlocking of the first and second roof parts in the closed position of the roof. The locking device has a first closing unit for mutual interlocking of the first and second roof parts and which is coupled to a drive mechanism. The first closing unit has a coupling mechanism to couple to a second closing unit which acts on one of the first and second roof parts and which interlocks the acted upon roof part to a third roof part or to a body part.

9 Claims, 6 Drawing Sheets

ROOF FOR A CONVERTIBLE VEHICLE INCLUDING LOCKING DEVICE

BACKGROUND OF THE INVENTION

1. Field of the Invention

The present invention relates to a roof for a vehicle, such as a convertible motor vehicle, and more particularly to a roof for a convertible vehicle having roof parts that can be moved between a closed position covering the vehicle interior and a lowered position clearing the vehicle interior.

2. Description of Related Art

Published German Patent DE 196 34 511 C1 (and its counterpart U.S. Pat. No. 5,944,375), discloses a convertible vehicle with a two-part hard-top which can be folded together and which is movably supported laterally by means of a parallelogram linkage which has two connecting rods. The front roof part can be fixed by means of an interlocking device on an apron, during which the two parallelogram connecting rods can be interlocked by means of a blocking mechanism that prevents swiveling. The blocking mechanism is coupled by means of a Bowden cable to the interlocking device on the front roof part so that with unlocking of the interlocking device the blocking mechanism is actuated at the same time for release of the parallelogram connecting rods.

SUMMARY OF THE INVENTION

A primary object of the present invention is to provide roof for a convertible vehicle with a locking device which is suited for use in variously configured roofs.

The above and other objects are achieved by providing a roof for a convertible vehicle, including a locking device which has a closing unit for mutual interlocking of two roof parts and which is coupled to a drive means to form a drive connection. The closing unit has a coupling means via which with a roof closing drive connection is established to a second closing unit which acts on one of the two roof parts and which interlocks the acted upon roof part to another roof part or a body part. With a locking device which is configured in such a way, the two roof parts can be interlocked, and via the interlocking closing unit the drive can be coupled to another closing means, if the two roof parts are interlocked to one another in the closed position. The two roof parts can be separated from one another when two bordering roof sections of the two roof parts move away from one another when the roof is being lowered. Thus, several closing units for several roof parts can be actuated with a driving means via a driving train which can be separated and reconnected.

Preferably, the connection between the drive means and the closing unit and between the closing units is made as rods and/or as compressively stiff cables. In particular, the compressively stiff cables enable simple connections which can be almost arbitrarily guided and installed.

In one preferred configuration, a closing unit, which includes the coupling means, has a first bearing part which movably supports a locking journal and is located on one roof part, and has a second bearing part which movably supports a slide and which is located on an adjacent roof part for interaction with the first bearing part. The closing motion of the roof or roof part then couples the locking journal to the slide and the opening motion of the roof or the roof parts separates the locking journal from the slide. Coupling takes place automatically. The slide is pre-tensioned into its coupling position or is moved by an actuating means into the coupling position so that it assumes a defined coupling position.

Each of the closing units can include a centering means which in the closed position of the roof is held by two adjacent roof parts or one roof part and an adjacent body part centered to one another, advantageously, providing an additional safety device which can hold the roof parts together, especially, in the case of a crash.

The roof for a convertible vehicle is explained in detail below with respect to exemplary embodiments and with reference to the accompanying drawings.

DETAILED DESCRIPTION OF THE INVENTION

Figure 1:
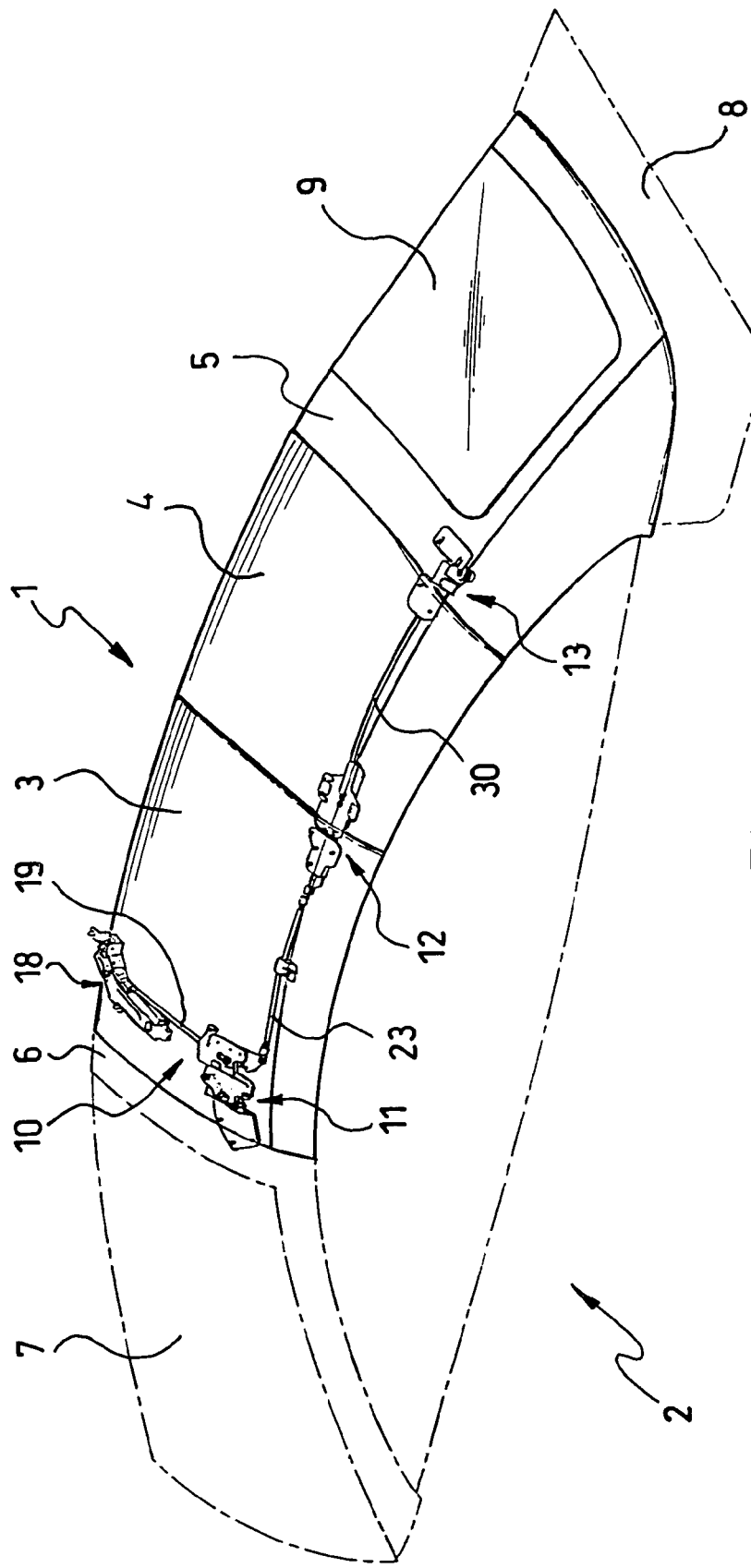
FIG. 1 is a side perspective view of the left half of a roof of a convertible which has three roof parts in a closed position, a closing means keeping the roof parts interlocked to a front, a middle and a rear closing unit.

As shown in FIG. 1, the roof 1 of a convertible vehicle 2 can be configured as a hard-top and can be opened with a front roof part 3 or a front segment, a middle roof part 4 or a middle segment and a rear roof part 5 or a rear segment. The convertible 2 can include one row of seats or front and back rows of seats, wherein the lengths of the individual roof parts 3, 4, 5 can be matched to the respective length of the vehicle interior. When the roof 1 is opened and lowered after the front roof part 3 has been decoupled from the apron 6 above the windshield 7, the front roof part 3, the middle roof part 4 and the rear roof part 5 are lowered into a roof stowage compartment or convertible top compartment 8 which is located in the rear area of the convertible 2 and is covered by the lid of the convertible top compartment or the trunk.

The three roof parts 3, 4, 5 are pivotally supported via bearing means (not shown) which are provided on either side on the roof parts. The middle roof part 4 is pivotally supported, for example, by means of a main four-bar mechanism on the body such that it is deposited pointing upward with its top in the convertible top compartment 8. The front roof part 3 is pivotally mounted by means of a four-bar mechanism on the middle roof part 4 and is swung so as to be cambered in the same direction when being lowered, i.e., likewise with a top which faces up toward the middle roof part 4. The rear roof part 5 or the rear element which includes, for example, a rear window 9 is pivotally mounted by means of a four-bar mechanism arrangement on the middle roof part 4 or on its support. When the roof 1 is lowered, the front roof part 3 is swung onto the middle roof part 4, and then, the rear roof part 5 is swung onto the front roof part 3. This compact, identically cambered unit, then is swung into the convertible top compartment 8. The roof 1 can operate, for example, as further described in German patent application 101 50 218.4 and counterpart U.S. patent application Ser. No. 10/270,074, now U.S. Pat. No. 6,736, 444. Accordingly, reference is made to such disclosure for providing a detailed explanation of the structure and the dynamic behavior when the roof 1 is being lowered and that application is hereby incorporated by reference to the extent necessary to complete an understanding of the present invention.

In order to keep the roof 1 interlocked in its closed position, as shown in FIG. 1, a laterally a locking device 10 is provided with a front closing unit 11, a middle closing unit 12 and a rear closing unit 13. The front closing unit 11 includes a locking hook 14 which is pivotally supported on a carrier plate 15 which is attached to the bottom of the front roof part 3. For interlocking, the locking hook 14 extends around a locking journal 16 which is located on the carrier plate 17 which is attached to the apron 6. The actuation or swinging of the locking hook 14 takes place by a drive means 18 which is mounted centrally in the front area of the front roof part 3 and is coupled via a drive rod 19 to a pivot lever 20 which is connected to the locking hook 14 for joint swiveling during a drive connection.

Figure 2:
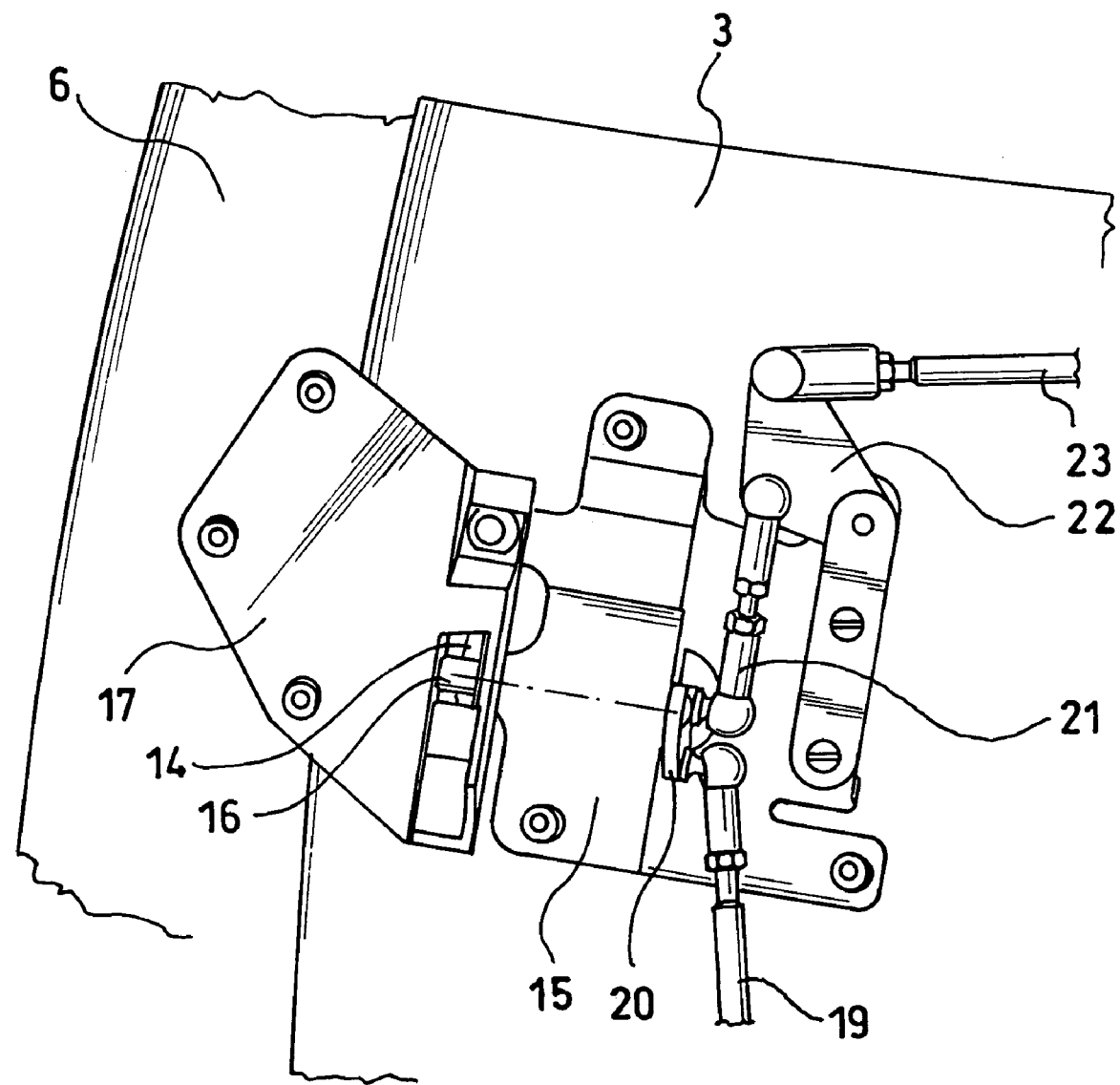
FIG. 2 is a bottom plan view of the front closing unit for interlocking of the front roof part on an apron.
Figure 3:
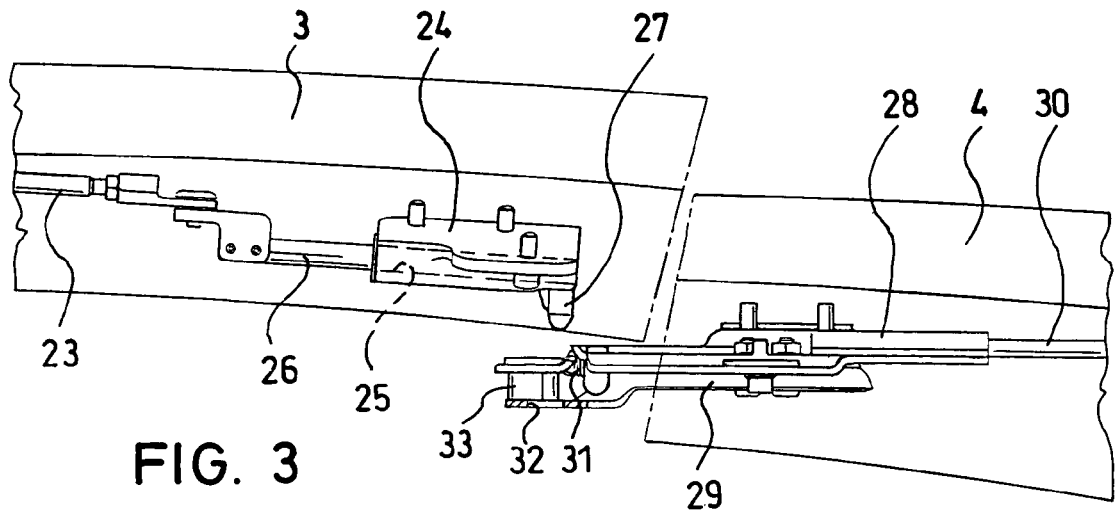
FIG. 3 is a side view of the front roof part and the middle roof part which approach one another when the roof closes, with the middle closing unit configured prior to locking engagement.
Figure 4:
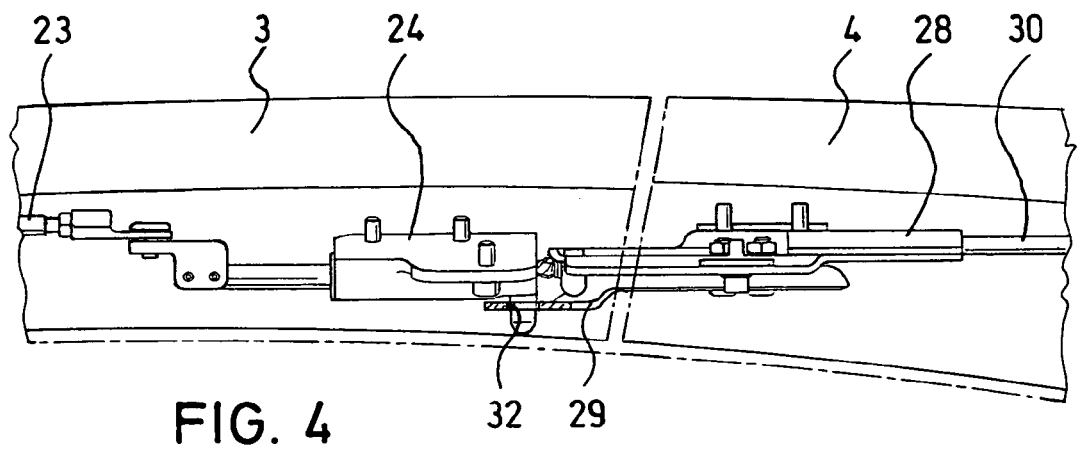
FIG. 4 is a side view of the front roof part and the middle roof part in their closed position, the middle closing unit being in locking engagement and a drive connection to the rear closing unit being established.
Figure 5:
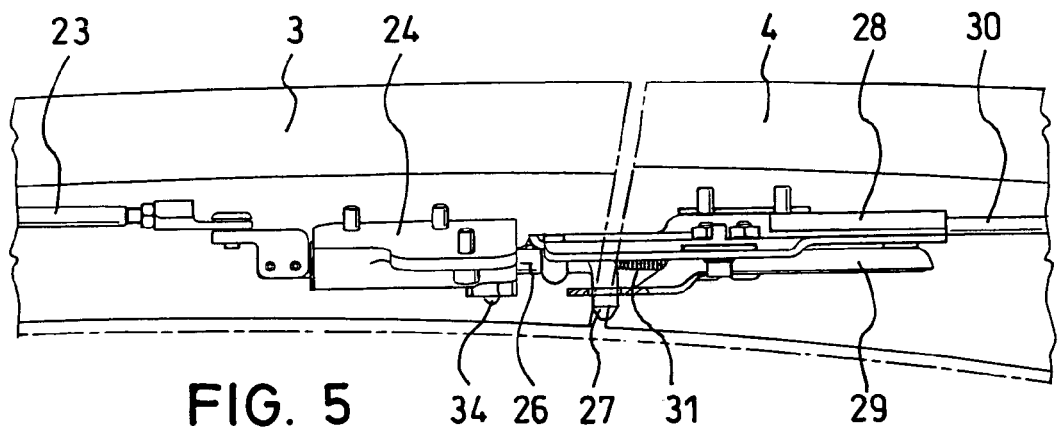
FIG. 5 is a side view of the front roof part and the middle roof part in their closed position, the middle closing unit being in locking engagement and a drive connection having executed driving motion to the rear closing unit.
Figure 6:
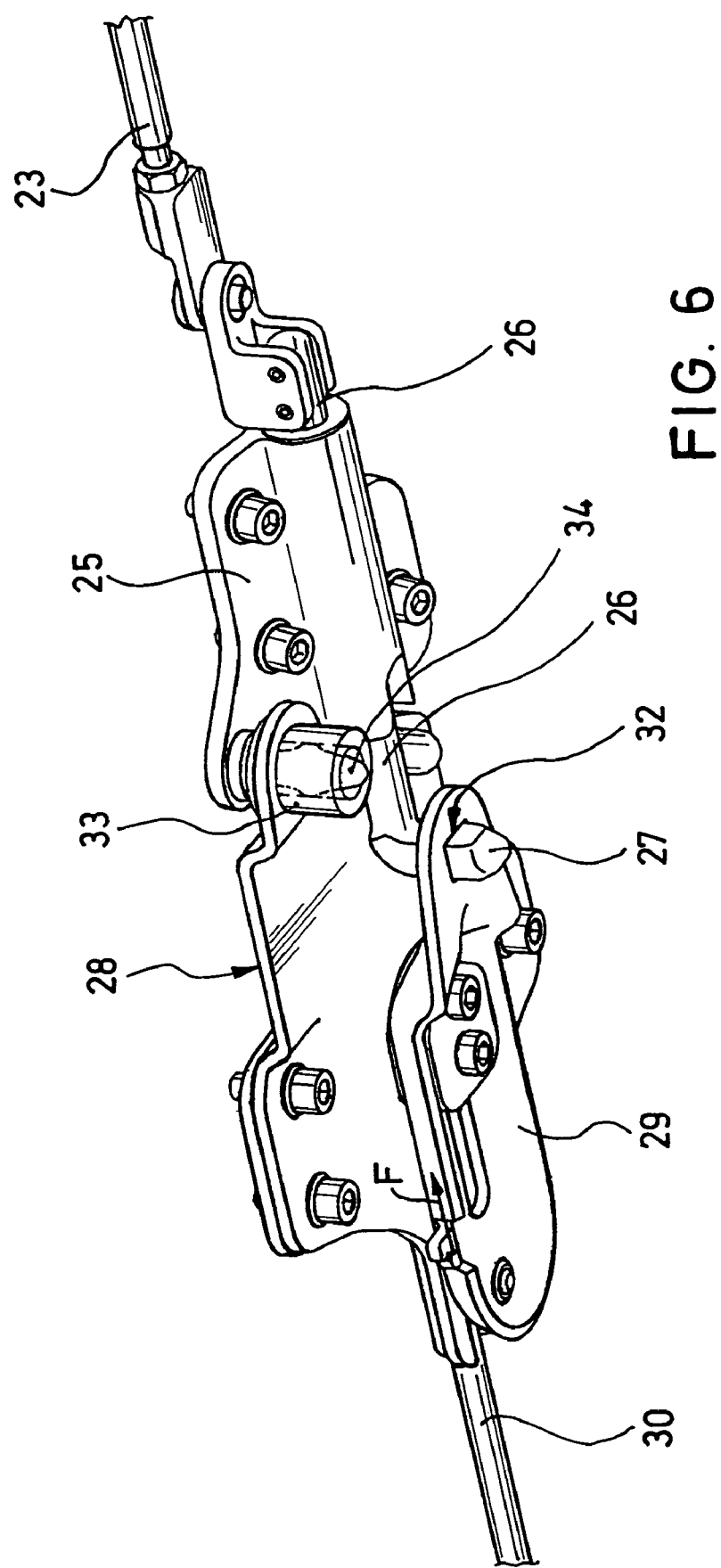
FIG. 6 is a perspective bottom view of the middle closing unit in the position as shown in FIG. 5.
Figure 7:
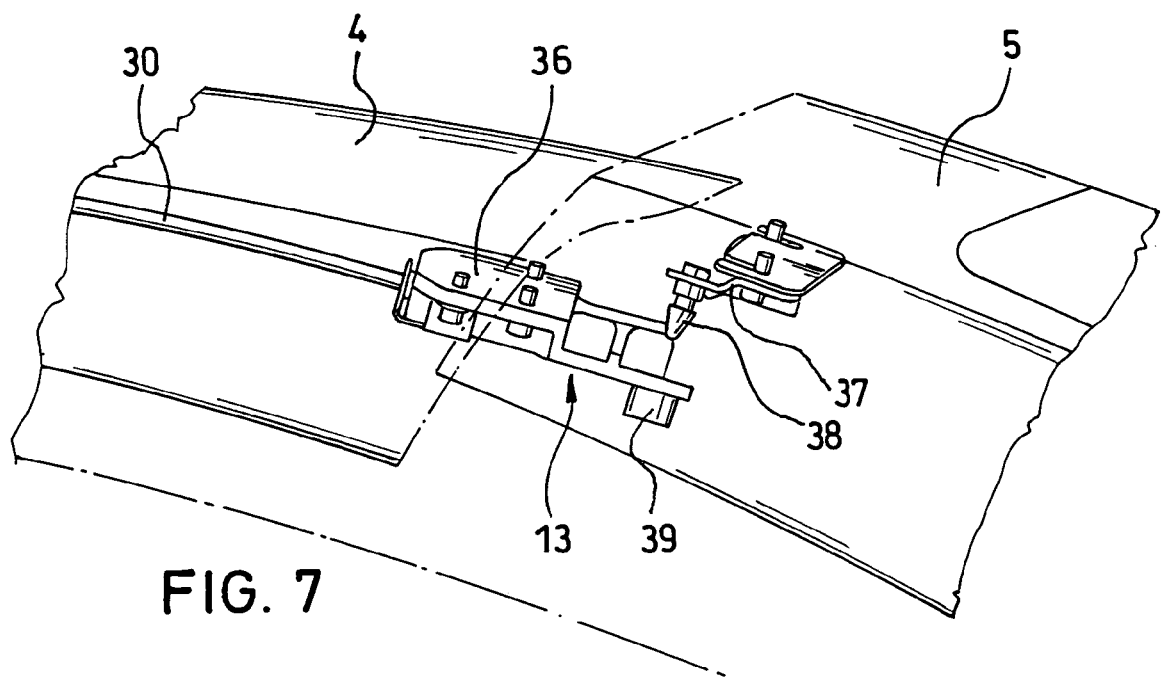
FIG. 7 is a side view of the middle roof part and the rear roof part which approach one another as the roof is being closed, the rear closing unit still configured prior to locking engagement.

Furthermore, as shown in FIG. 2, pivot lever 20 is coupled by means of an intermediate rod 21 and a pivot part 22 to a connecting rod 23 which forms a drive connection to the middle closing unit 12. The middle closing unit 12, as shown in FIGS. 3–6, includes a bearing part 24 which is securely attached to the rear section of the front roof part 3 with a lengthwise guide 25, in which a locking journal 26 which is securely connected to the connecting rod 23 is movably supported. The angled locking tip 27 of the locking journal 26 projects downward. Furthermore, the middle closing unit 12 includes a bearing part 28 which is attached to the front section of the middle roof part 4 and on which a slide 29 is supported to be able to move lengthwise and is connected to the connecting cable 30 which leads to the rear closing unit 13. The connecting cable 30 is, for example, a compression-tension cable which is known, for example, from sliding roof drives, but alternatively a drive rod or connection rod can also transfer a driving or actuating force to the rear closing unit 13. A tension spring 31 pretensions the slide 29 into a coupling position in the direction to the front roof part 3, as shown in FIGS. 3 and 4 and as indicated by the arrow F in FIG. 6 which symbolizes a spring. In the coupling position in which the slide 29 projects from the middle roof part 4, the locking tip 27 of the locking journal 26 can fit into a slide opening 32, wherein when the roof 1 closes the front roof part 3 is lowered relative to the middle roof part 4, as shown in motion from FIG. 3 to FIG. 4.

A centering sleeve 33 is attached to the bearing part 28 and is designed to accommodate a conical centering journal 34 which is attached to the front bearing part 24 and which enters the centering sleeve 33 when the front roof part 3 is lowered relative to the middle roof part 4.

As shown in FIG. 4, in the closed position of the front roof part 3 and of the middle roof part 4 centered to one another, when the drive means 18 is actuated and by transfer of the locking motion via the drive train, the rear closing unit 13 can be actuated. In doing so, as shown FIG. 5, the connecting rod 23, the locking journal 26, the locking tip 27 and the coupled slide 29, as well as the connecting cable 30 which is connected the coupled slide 29 are pushed. In the vertical or Z direction, centering or interlocking takes place by the locking journal 26 which rests on the bottom of the bearing part 28.

Figure 8:
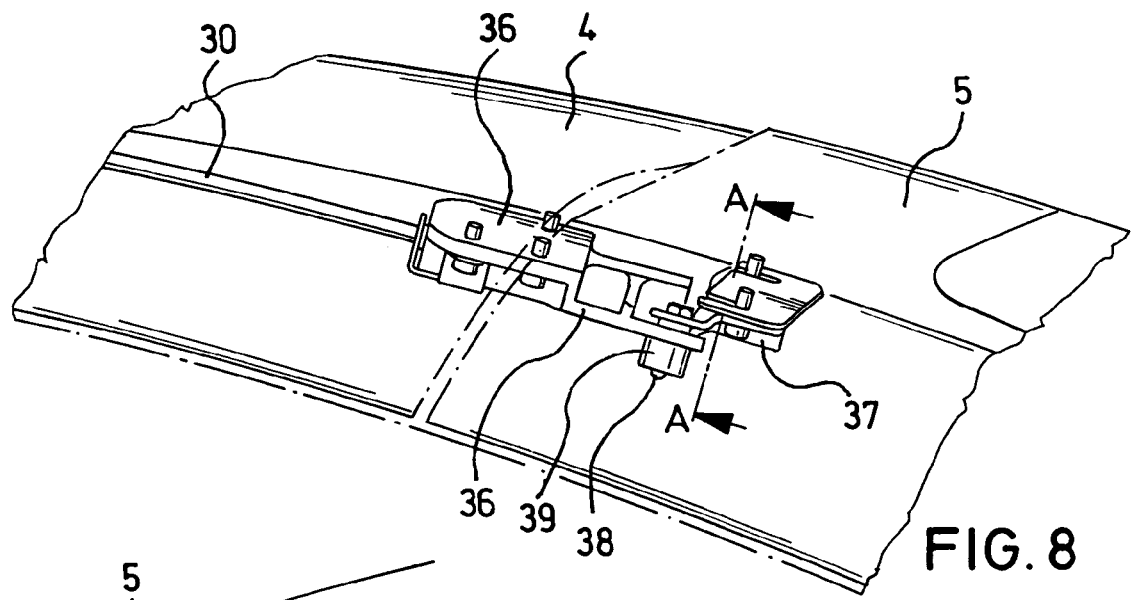
FIG. 8 is a side view of the middle roof part and the rear roof part in the interlocked closed position.
Figure 9:
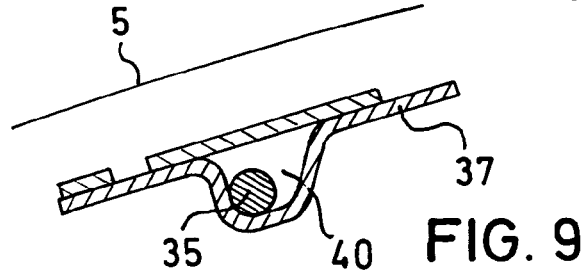
FIG. 9 is a sectional view taken along line A-A in FIG. 8, the rear closing unit being in the locked position.
Figure 10:
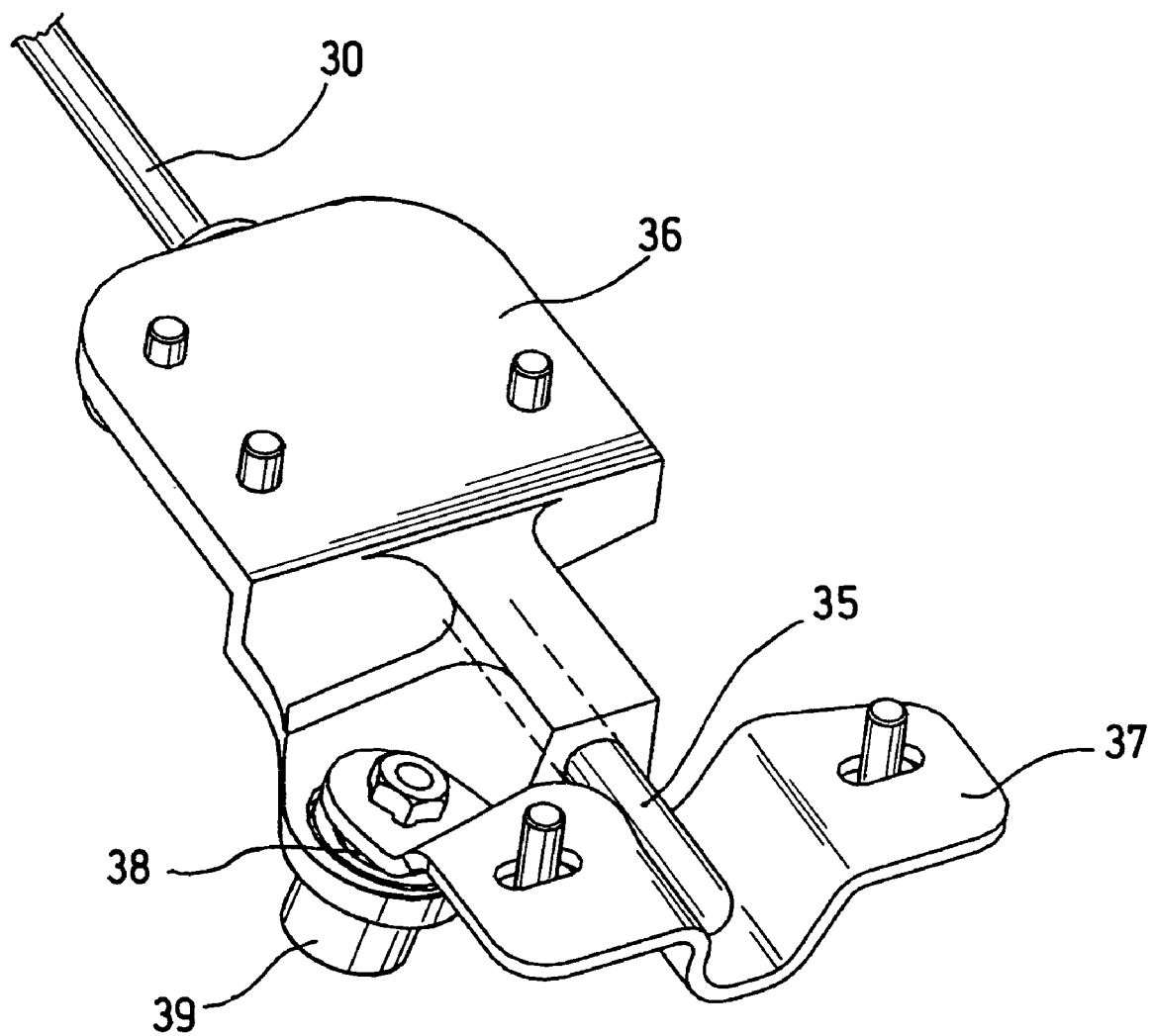
FIG. 10 is a perspective overhead view of the rear closing unit in the locked position shown in FIG. 9.

As shown in FIGS. 7–10, the connecting cable 30 on a back end thereof is connected to a locking journal 35 which is movably held in the lengthwise direction in the front bearing part 36 of the rear closing unit 13, which part is attached to the rear section of the middle roof part 4. The rear closing unit 13 furthermore includes a rear bearing part 37 which is attached to the front section of the rear roof part 5 and has a centering journal 38 which is designed to engage a centering sleeve 39 which is attached to the front bearing part 36. Centering engagement takes place while the middle roof part 4 and the rear roof part 5 approach one another when the roof 1 closes until they border one another superficially flush, as shown in motion from FIG. 7 to FIG. 8. In the centered position, as shown in FIG. 8, the locking journal 35 which has been actuated by the connecting cable 30 is pushed into a journal receiver 40 which is attached to the rear bearing part 37. In the journal receiver 40, the locking journal 35 rests interlocked in the Y (transverse) and the Z (vertical) direction.

The roof 1 also includes on an opposing right side thereof such a locking device 10 which is drive-connected by the central drive means 18 by means of a right-side drive rod so that the right and the left locking device can be actuated by the drive means 18 at the same time.

The drive means 18 can work by means of a mechanical, electrical, hydraulic or pneumatic driving force. Deviating from the illustrated arrangement on, the front roof part in a driving connection to the front closing unit 11, the drive means 18 also can be located on the back end of the front roof part and in a driving connection to the back end of the connecting rod 23, for example, by means of a deflection lever in the area of the middle closing unit 12. Furthermore, the drive means 18 also can be supported on the middle roof part 4 and can be drive-connected to the rear connecting means or the connecting cable 30 or a connecting rod, for example, by coupling to the middle closing unit 12 or the rear closing unit 13, in this case the locking journal 26 of the middle closing unit 12, before interlocking by an actuating means such as, for example, a spring having to be moved into a defined position.

The closing units are securely mounted on the bottoms of the roof parts of the hard-top roof which are formed as fixed roof-shells, but also can be attached to a support frame which is connected to the bearing means for the roof parts and to which the roof parts are attached.

Furthermore, the locking device also can be used for a roof with, for example, four roof parts, wherein another closing unit corresponding to the middle closing unit 12 which likewise enables coupling or interruption of the driving train on the additional separating point can be provided.

The centering journals, for correspondingly stable dimensioning, form a safeguard for the roof parts against displacement in the case of a crash.

The roof parts can be adjusted and production tolerances can be equalized by means of the closing units or the bearing parts thereof.

The locking device can be used for versatile purposes and can be adapted by variation of components thereof to different types of roofs. For example, the locking device also is suitable for soft-top roofs in which the roof parts form the individual frames of the support structure, or in general for any roof with several roof or frame parts which are interlocked to one another or to the body.

What is claimed is:

1. A roof for a convertible vehicle, comprising:
   first and second roof parts and a bearing mechanism for moving the first and second roof parts between a closed position for covering an interior of a vehicle and a lowered position in a rear roof deposition space for exposing the vehicle interior; and
   a locking device for interlocking of the first and second roof parts in the closed position of the roof,
   wherein the locking device has a first closing unit for mutual interlocking of the first and second roof parts and which is coupled to a drive means, and
   wherein the first closing unit has a coupling means for coupling to a second closing unit which acts on one of the first and second roof parts and which interlocks the acted upon roof part to a third roof part or to a body part; and
   wherein one of the closing units has a bearing part which is attached to one of the first and second roof parts, the bearing part having a centering journal which is adapted to engage a centering sleeve which is attached to a bearing part on the other of the first and second roof parts so as to produce, when the roof closes, a centering engagement from when the first and second roof parts come into proximity with one another until they border each other and locking elements of the locking device engage.

2. The roof of claim 1, wherein said coupling means additionally forms a connection between the drive means and a third closing unit and is formed by at least one of rods and compressively stiff cables.

3. The roof of claim 1, wherein the first, second and third roof parts comprise a front roof part, a middle roof part, and a rear roof part, respectively,
   the first, second and third roof closing units comprise a middle closing unit, a rear closing unit, and a front closing unit, respectively,
   the body part comprises an apron,
   the front closing unit interlocks the front roof part to the apron,
   the middle closing unit interlocks the front roof part to the middle roof part,
   the rear closing unit interlocks the middle roof part to the rear roof part, and
   the drive means is located on one of the roof parts.

4. The roof of claim 3, wherein the rear closing unit has a locking journal which is movably supported on a front bearing part and which is fixable on a rear bearing part.

5. The roof of claim 4, wherein the rear bearing part is located on one of the first, second and third roof parts or the body part.

6. The roof of claim 1, wherein the drive means includes a mechanically, electrically, hydraulically or pneumatically acting drive means.

7. A roof for a convertible vehicle, comprising:
   first and second roof parts and a bearing mechanism for moving the first and second roof parts between a closed position for covering an interior of a vehicle and a lowered position in a rear roof deposition space for exposing the vehicle interior; and
   a locking device for interlocking of the first and second roof parts in the closed position of the roof,
   wherein the locking device has a first closing unit for mutual interlocking of the first and second roof parts and which is coupled to a drive means, and
   wherein the first closing unit has a coupling means for coupling to a second closing unit which acts on one of the first and second roof parts and which interlocks the acted upon roof part to a third roof part or to a body part; wherein the first closing unit has a first bearing part which movably supports a locking journal on the first roof part, and a second bearing part which movably supports a slide on the second roof part and which is assigned to the first bearing part, and
   a closing motion of the roof or the first through third roof parts couples the locking journal to the slide, and an opening motion separates the locking journal from the slide.

8. The roof of claim 7, wherein the slide is pre-tensioned into a coupling position thereof.

9. The roof of claim 7, wherein each of the first through third closing unit includes a centering means for centering two adjacent parts relative to one another in the closed position of the roof, said two adjacent parts being parts of one of the first and second roof parts, the second and third roof parts, the first roof part and a body part adjacent thereto.

* * * * *